United States Patent
Miyama et al.

(10) Patent No.: US 10,469,003 B2
(45) Date of Patent: Nov. 5, 2019

(54) ROTATING ELECTRIC MACHINE

(71) Applicant: MITSUBISHI ELECTRIC CORPORATION, Chiyoda-ku (JP)

(72) Inventors: Yoshihiro Miyama, Chiyoda-ku (JP); Hideaki Arita, Chiyoda-ku (JP); Akihiro Daikoku, Chiyoda-ku (JP); Kan Akatsu, Koto-ku (JP); Hiroki Hijikata, Koto-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/579,449

(22) PCT Filed: Jul. 27, 2015

(86) PCT No.: PCT/JP2015/071282
§ 371 (c)(1),
(2) Date: Dec. 4, 2017

(87) PCT Pub. No.: WO2017/017769
PCT Pub. Date: Feb. 2, 2017

(65) Prior Publication Data
US 2018/0145617 A1  May 24, 2018

(51) Int. Cl.
*H02P 25/22* (2006.01)
*H02P 6/14* (2016.01)
(Continued)

(52) U.S. Cl.
CPC .............. *H02P 6/14* (2013.01); *H02K 1/165* (2013.01); *H02K 1/2753* (2013.01); *H02K 3/12* (2013.01);
(Continued)

(58) Field of Classification Search
CPC ...... H02K 15/04; H02K 1/165; H02K 1/2753; H02K 3/12; H02K 5/1732; H02P 25/022; H02P 6/14
See application file for complete search history.

(56) References Cited

U.S. PATENT DOCUMENTS

| 6,232,731 | B1 | 5/2001 | Chapman | |
| 2013/0187510 | A1* | 7/2013 | Takiguchi | H02K 3/12 |
| | | | | 310/207 |

(Continued)

FOREIGN PATENT DOCUMENTS

| JP | 6-205573 A | 7/1994 |
| JP | 11-27987 A | 1/1999 |

(Continued)

OTHER PUBLICATIONS

International Search Report dated Oct. 13, 2015 in PCT/JP2015/071282 filed Jul. 27, 2015.

*Primary Examiner* — Muhammad S Islam
(74) *Attorney, Agent, or Firm* — Oblon, McClelland, Maier & Neustadt, L.L.P.

(57) ABSTRACT

One end of each of phase conductors wound around a stator core in a wave winding arrangement is connected to a positive electrode terminal of a DC power supply through a first positive electrode side switch and is connected to a negative electrode terminal of the DC power supply through a second negative electrode side switch. The other end of the phase conductor is connected to the negative electrode terminal of the DC power supply through a first negative electrode side switch and is connected to the positive electrode terminal of the DC power supply through a second positive electrode side switch. The first positive electrode side switch, the second negative electrode side switch, the first negative electrode side switch, and the second positive electrode side switch are controlled by a controller, whereby (Continued)

amplitude and phase of current passing through each of the phase conductors are individually controlled.

11 Claims, 12 Drawing Sheets

(51) Int. Cl.
    *H02K 15/04*     (2006.01)
    *H02K 3/12*     (2006.01)
    *H02K 1/16*     (2006.01)
    *H02K 1/27*     (2006.01)
    *H02K 5/173*     (2006.01)
    *H02P 25/024*     (2016.01)

(52) U.S. Cl.
    CPC ........... *H02K 15/04* (2013.01); *H02K 5/1732* (2013.01); *H02P 25/024* (2016.02)

(56) References Cited

U.S. PATENT DOCUMENTS

| | | | |
|---|---|---|---|
| 2013/0241369 A1 | 9/2013 | Imazawa et al. | |
| 2014/0361646 A1* | 12/2014 | Saito | H02K 3/28 310/51 |
| 2015/0028712 A1 | 1/2015 | Horiba et al. | |
| 2016/0276964 A1* | 9/2016 | Zushi | B60L 15/007 |

FOREIGN PATENT DOCUMENTS

| | | |
|---|---|---|
| JP | 11-127593 A | 5/1999 |
| JP | 2004-254445 A | 9/2004 |
| JP | 2009-232617 A | 10/2009 |
| JP | 2015-23754 A | 2/2015 |
| WO | 2012/086067 A1 | 6/2012 |

* cited by examiner though a first negative electrode side switch that turns on and off current, and the other end electrically connected to the positive electrode terminal of the DC power supply through a second positive electrode side switch that turns on and off current and electrically connected to the negative electrode terminal of the DC power supply through a second negative electrode side switch that turns on and off current.

ROTATING ELECTRIC MACHINE

TECHNICAL FIELD

The present invention relates to a rotating electric machine capable of switching the amplitude and phase of current passing through armature conductors depending on the operating state thereof.

BACKGROUND ART

There has been a proposed rotating electric machine that has an increased operating range and an improved characteristic by switching the number of turns of armature winding or a connection method between windings in the rotating electric machine.

For example, PTL 1 discloses an induction motor that has an increased operating range and an improved characteristic by switching the connection of coils having the same phase in armature winding constituted by n partial windings between series connection and parallel connection, and the phase coil connection between Y connection and Δ connection.

CITATION LIST

Patent Literature

[PTL 1] Japanese Patent Application Publication No. H11-027987

SUMMARY OF INVENTION

Technical Problem

Here, between a high speed range and a low speed range and between a high load range and a low load range in an operating range, different characteristics are required of a rotating electric machine.

For example in a low load range, torque ripple or current ripple is relatively large for output torque or input/output current, the effect of which is significant, and therefore a characteristic with small ripple is necessary.

Meanwhile, what is most required in a high load range is to keep the temperature of components that constitute the rotating electric machine within an acceptable value range.

In the induction motor described above, the line voltage peak value and the current density of the phase coil are changed for example by changing the number of turns of the phase coil, serial-parallel switching, or Y-Δ connection change, but the gap magnetic flux density waveform itself between the stator and the rotor does not change by these kinds of switching, and characteristics attributable to the gap magnetic flux waveform such as torque ripple and current ripple cannot be changed.

Generally, a gap magnetic flux distribution generated by an armature by distributed winding can approximate to a sinusoidal wave more than concentrated winding, and a gap magnetic flux distribution by short-pitch winding can approximate to a sinusoidal wave more than full-pitch winding.

Therefore, torque ripple may be reduced in a rotating electric machine having a short-pitch winding pattern more easily than in a machine having a concentrated winding pattern.

Meanwhile, since a magnetic flux use efficiency by short-pitch winding is low, more current is necessary to provide necessary torque, and therefore it is difficult to establish a target temperature with a high load.

A rotating electric machine free from the problem can be provided if different magnetic flux waveforms may be reproduced by changing the amplitude and phase of current passed through phase coils using a distributed winding or a concentrated winding either in a full-pitch winding or short-pitch winding arrangement.

However, in practice, current must be passed in such a manner that magnetic fluxes generated by phase coils cancel each other as the magnetic fluxes are combined, which in turn results in a useless conductor that only generates a conductor loss without contributing to torque generation, and the efficiency is lowered.

Now, the useless conductor will briefly be described.

FIG. 17 is a view of a coil 50 wound around a stator core 51 when viewed in the axial direction of a rotating electric machine, FIG. 18 is a diagram showing the direction of current passing through the coils 50 when viewed in the radial direction of the rotating electric machine in FIG. 17, and the arrow indicates the direction of the current passing through the coil 50.

In a conventional arrangement for switching among full-pitch winding, short-pitch winding, and concentrated winding, for example the concentrated winding coil 50 is wound around the stator core 51.

When a magnetic flux waveform is generated by a distributed winding at intervals of two slots as shown in FIG. 17, the adjacent intermediate coils 50 are connected with each other so that the coils 50 at intervals of two slots are connected.

In this case, as can be understood from FIG. 18, the directions of current passing through the two coils 50 inserted in the same slot are opposite to each other, and therefore the magnetic fluxes cancel each other.

Therefore, the intermediate coils 50 between the connected coils 50 at intervals of two slots end up being a so-called useless conductor that generates a conductor loss by current passed therethrough but does not generate any effective magnetic flux.

Furthermore, when a large number of partial windings are connected through switches such as transistors and the states of the windings are changed in response to the opening/closing of the switches as disclosed in PTL 1, the number of switches and switch controllers would be enormous, which complicates the machine and increases the size of the machine.

It is an object of the present invention to solve the problem and provide a low-loss rotating electric machine that is free from a loss attributable to a useless conductor and forms a gap magnetic flux waveform for providing an increased operating range and an optimum characteristic required in each operating point without increasing the number of switches and switch controllers.

Solution to Problem

A rotating electric machine according to the present invention includes a rotor, and a stator provided to surround the rotor and including a stator core in which a plurality of axially extending stator slots are formed and phase conductors inserted through the stator slots each in a wave winding arrangement, the phase conductors each have one end electrically connected to a positive electrode terminal of a DC power supply through a first positive electrode side switch that turns on and off current and electrically connected to a negative electrode terminal of the DC power supply through a negative electrode side part that controls current, the phase conductors each have the other end electrically connected to the negative electrode terminal of the DC power supply through a first negative electrode side switch that turns on and off current and electrically connected to the positive electrode terminal of the DC power supply through a positive electrode side control part that controls current, and the first positive electrode side switch, the negative electrode side control part, the first negative electrode side switch, and the positive electrode side control part are controlled by a controller, so that an amplitude and a phase of current passing through each of the phase conductors are individually controlled.

Advantageous Effects of Invention

In the rotating electric machine according to the present invention, the phase conductors inserted through the stator slots in a winding wave arrangement each have one end electrically connected to a positive electrode terminal of a DC power supply through a first positive electrode side switch that turns on and off current and electrically connected to a negative electrode terminal of the DC power supply through a negative electrode side control part that controls current and the phase conductors each have the other end electrically connected to the negative electrode terminal of the DC power supply through a first negative electrode side switch that turns on and off current and electrically connected to the positive electrode terminal of the DC power supply through a positive electrode side control part that controls current, and the first positive electrode side switch, the negative electrode side control part, the first negative electrode side switch, and the positive electrode side control part are controlled by a controller, so that an amplitude and a phase of current passing through each of the phase conductors are individually controlled.

Therefore, a low-loss rotating electric machine that is free from a loss attributable to a useless conductor can be provided, and the machine forms a gap magnetic flux waveform for providing an increased operating range and an optimum characteristic required in each operation point without increasing the number of switches and switch controllers.

DESCRIPTION OF EMBODIMENTS

Figure 1:
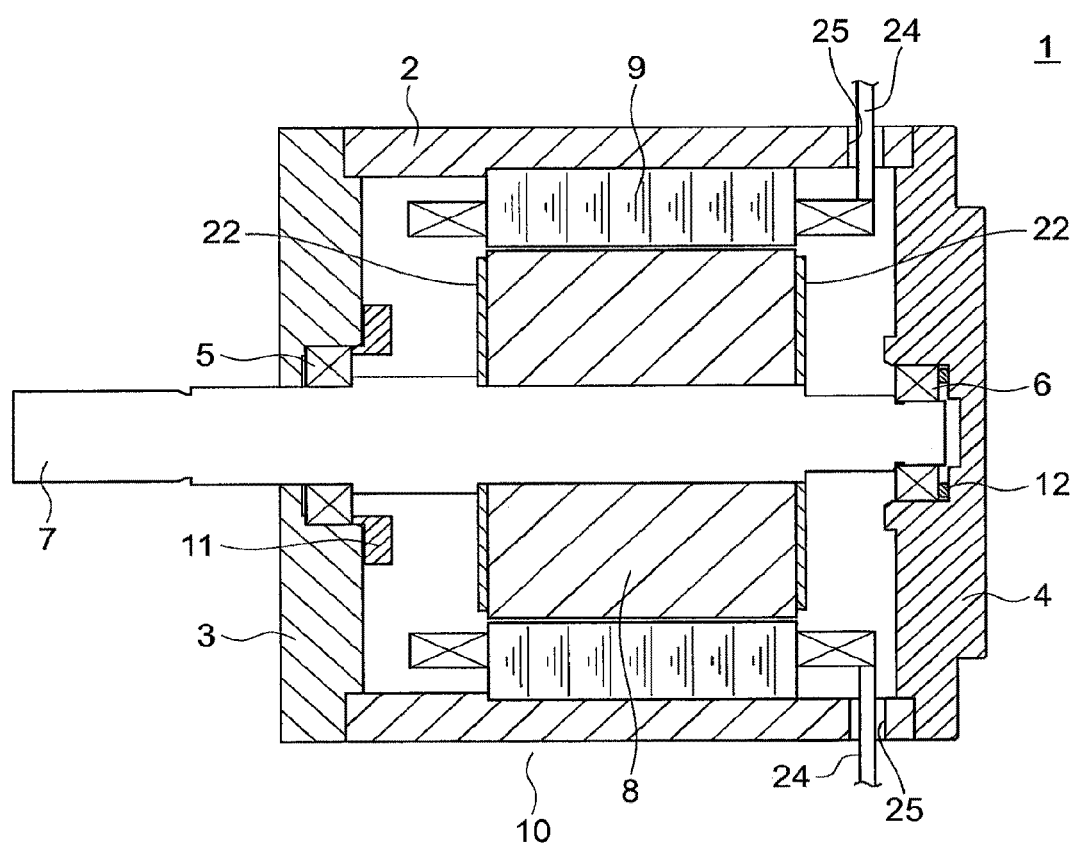
FIG. 1 is a side sectional view of a motor according to a first embodiment of the present invention.

Hereinafter, embodiments of the present invention will be described in conjunction with the accompanying drawings, in which the same or corresponding members and portions will be designated by the same reference characters.

First Embodiment

Figure 2:
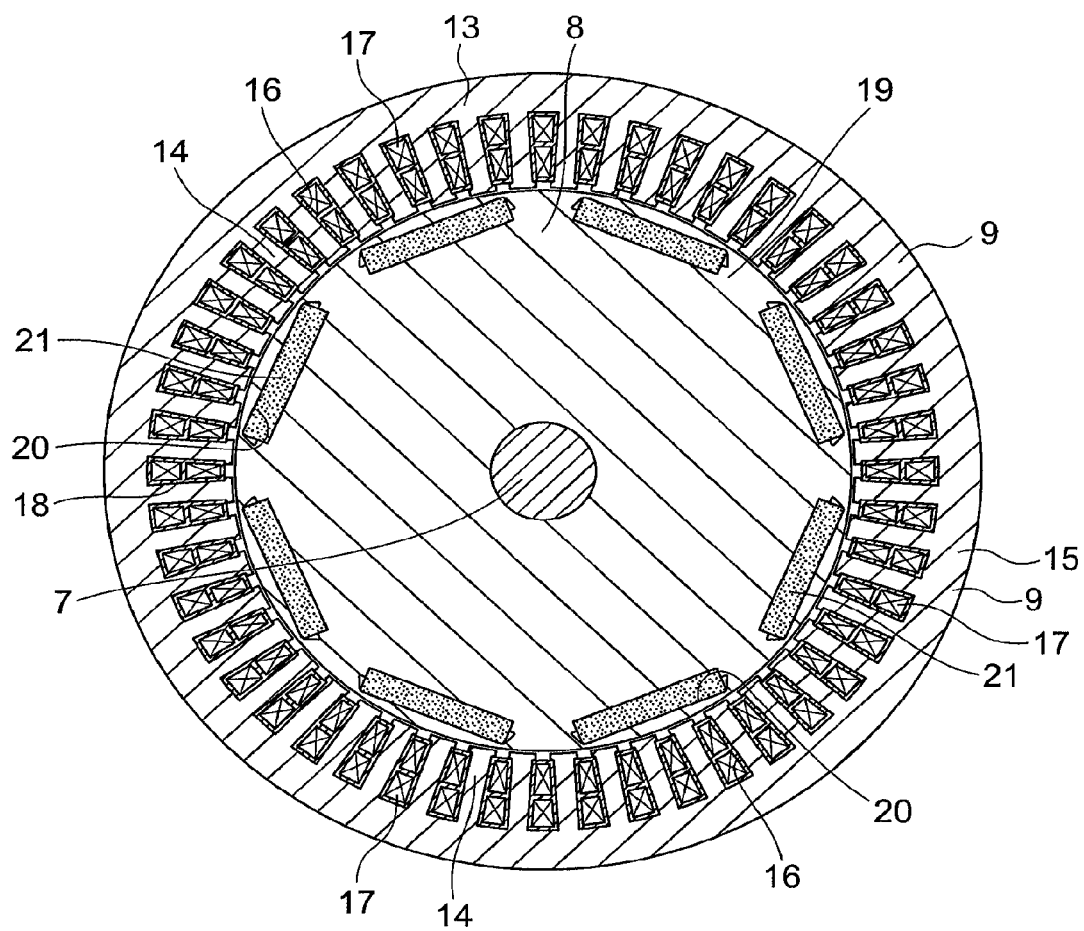
FIG. 2 is a front sectional view of the motor in FIG. 1.

FIG. 1 is a side sectional view of a motor 1 according to a first embodiment of the invention, and FIG. 2 is a front sectional view of the motor 1 in FIG. 1.

The motor 1 is a permanent magnet motor having eight poles and 48 slots.

The motor 1 as a rotating electric machine includes a cylindrical frame 2, a load side bracket 3 and a counter load side bracket 4 provided to cover both sides of the frame 2, a shaft 7 provided on the central axial line of the frame 2 and rotatably supported at two points, i.e., at the load side bracket 3 and the counter load side bracket 4 through a load side bearing 5 and a counter load side bearing 6, a rotor 8 that has the shaft 7 inserted therein for integration for example by a key and is stored in a case 10 constituted by the frame 2, the load side bracket 3 and the counter load side bracket 4, and an annular stator 9 fixed at the inner wall surface of the frame 2 for example by press-fitting or shrinkage fitting to surround the rotor 8 with a gap therebetween.

The load side bearing 5 is axially fixed to the load side bracket 3 by a bearing presser 11 using a bolt or the like. The counter load side bearing 6 is provided with a degree of freedom in the axial direction with respect to the counter load side bracket 4 through a wave washer 12.

The case 10 is formed by fixing the load side bracket 3 and the counter load side bracket 4 to the frame 2 by bolts or the like.

The stator 9 includes a stator core 15 having 48 teeth 14 that project at equal intervals radially inwardly from the inner circumferential side of an annular yoke 13, two phase conductors 17 having the same phase and inserted side by side in the radial direction through each of the stator slots 16 that are formed between the teeth 14 and extend axially, and an insulator 18 that covers the phase conductors 17.

The stator core 15 is formed by laminating, on one another, a plurality of thin steel plates having both surfaces insulation treated.

The phase conductors 17 are integrally molded with the insulator 18, and the phase conductors 17 coated with the insulator 18 are pressed into the stator slots 16 and fixed to the stator core 15 as a result.

The phase conductors 17 are each inserted through a stator slot 16 from one end of the stator core 15 in the axial direction and exposed on the other end thereof, then inserted through the stator slot 16 separated by one pole pitch, i.e., the sixth stator slot 16 in the circumferential direction, from the other end of the stator slot 16 in the axial direction of the stator core 15, and exposed on the one end thereof, and again inserted through the stator slot 16 separated by one pole pitch in the circumferential direction from the one end of the stator slot 16, and exposed on the other end thereof.

The phase conductors 17 are inserted through the stator slots 16 in this manner three times in total around the stator core 15 in the wave winding arrangement.

Note that in FIG. 2, two phase conductors 17 having the same phase are inserted in each stator slot 16, and 12 phase conductors 17 in total are wound around the stator core 15 in the wave winding arrangement.

The section in FIG. 2 shows only one position collectively while a section of three positions of the phase conductors 17 including the inner diameter side phase conductor 17 and the outer diameter side phase conductor 17 should be indicated to represent the actual arrangement.

The ends of each of the phase conductors 17 are connected with one end of a load side lead 23 and one end of a counter load side lead 24. The load side lead 23 and the counter load side lead 24 are drawn out from the motor 1 through an outlet 25 formed at the frame 2.

The rotor 8 includes a cylindrical rotor core 19 having eight magnet slots 20 in total that are formed at equal intervals in the circumferential direction and extend in the axial direction, permanent magnets 21 inserted in the magnet slots 20 so that the N poles and the S poles are alternately positioned on the outer diameter side, and end plates 22 fixed at the axial ends of the rotor core 19 to block the sides of the magnet slot 20.

The end plates 22 are desirably made of a non-magnetic material.

Figure 3:
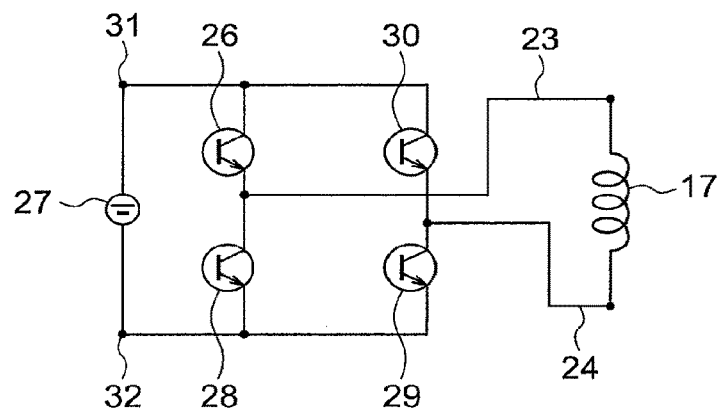
FIG. 3 is a feeding circuit diagram showing a feeding circuit for the motor in FIG. 1.

FIG. 3 is a feeding circuit diagram showing a feeding circuit for the motor 1 in FIG. 1.

The load side lead 23 is electrically connected to the positive electrode terminal 31 of a DC power supply 27 through a first positive electrode side switch 26 that turns on and off current and also electrically connected to the negative electrode terminal 32 of the DC power supply 27 through a second negative electrode side switch 28 serving as a negative electrode side control part that controls turning on and off of current.

The counter load side lead 24 is electrically connected to the negative electrode terminal 32 of the DC power supply 27 through a first negative electrode side switch 29 that turns on and off current and also electrically connected to the positive electrode terminal 31 of the DC power supply 27 through a second positive electrode side switch 30 serving as a positive electrode side control part that controls turning on and off of current.

In this manner, the feeding circuit for the motor 1 constitutes a so-called H-bridge circuit by the first positive electrode side switch 26, the second negative electrode side switch 28, the first negative electrode side switch 29, and the second positive electrode side switch 30.

Note that although not shown in FIG. 3, the amplitude and phase of current to be passed through each of the phase conductors 17 are individually adjusted by controllers that control driving of the switches 26, 30, 29, and 28.

One such controller is provided for each of the switches 26, 30, 29, and 28.

The first positive electrode side switch 26, the second positive electrode side switch 30, the first negative electrode side switch 29, and the second negative electrode side switch 28 are insulated gate bipolar transistors (IGBTs) using silicon semiconductor but these switches may be metal-oxide-semiconductor field-effect transistors (MOS-FETs).

Alternatively, the switches may be semiconductor switches using wide bandgap semiconductor such as silicon carbide (SiC) or gallium nitride (GaN).

Although not shown, flyback diodes are inserted in the first positive electrode side switch 26, the second positive electrode side switch 30, the first negative electrode side switch 29, and the second negative electrode side switch 28 parallel to these switches.

The DC power supply 27 may be a lead battery or a lithium ion battery.

The phase conductors 17 are each electrically connected to an individual H-bridge circuit, and the H-bridge circuits are each provided with an individual DC power supply 27.

Therefore, according to the embodiment, 12 H-bridge circuits, 12 phase conductors 17, and 12 controllers altogether are provided for one motor 1.

In FIG. 3, when the first positive electrode side switch 26 and the first negative electrode side switch 29 are turned on and the second negative electrode side switch 28 and the second positive electrode side switch 30 are turned off in response to driving of the controllers, the end of the load side lead 23 attains a positive electrode side potential, and the end of the counter load side lead 24 attains a negative electrode side potential.

As a result, current passes through the phase conductor 17 from the load side lead 23 to the counter load side lead 24.

Meanwhile, when the first positive electrode side switch 26 and the first negative electrode side switch 29 are turned off and the second negative electrode side switch 28 and the second positive electrode side switch 30 are turned on in response to driving of the controllers, the end of the load side lead 23 attains a negative electrode side potential, and the end of the counter load side lead 24 attains a positive electrode side potential.

As a result, current passes through the phase conductor 17 from the counter load side lead 24 to the load side lead 23.

When the four switches 26, 30, 29, and 28 of the H-bridge circuit are all turned off, the phase conductor 17 is disconnected from the DC power supply 27 and no current is passed therethrough.

In this manner, the controller switches between on and off states of the switches 26, 30, 29, and 28 and changes the ratio of on and off periods for the switches, so that current having an arbitrary amplitude and phase may be passed through each of the phase conductors 17.

Now, the operation of the motor 1 will be described with reference to a 6-phase motor 1 having the above configuration.

Figure 4:
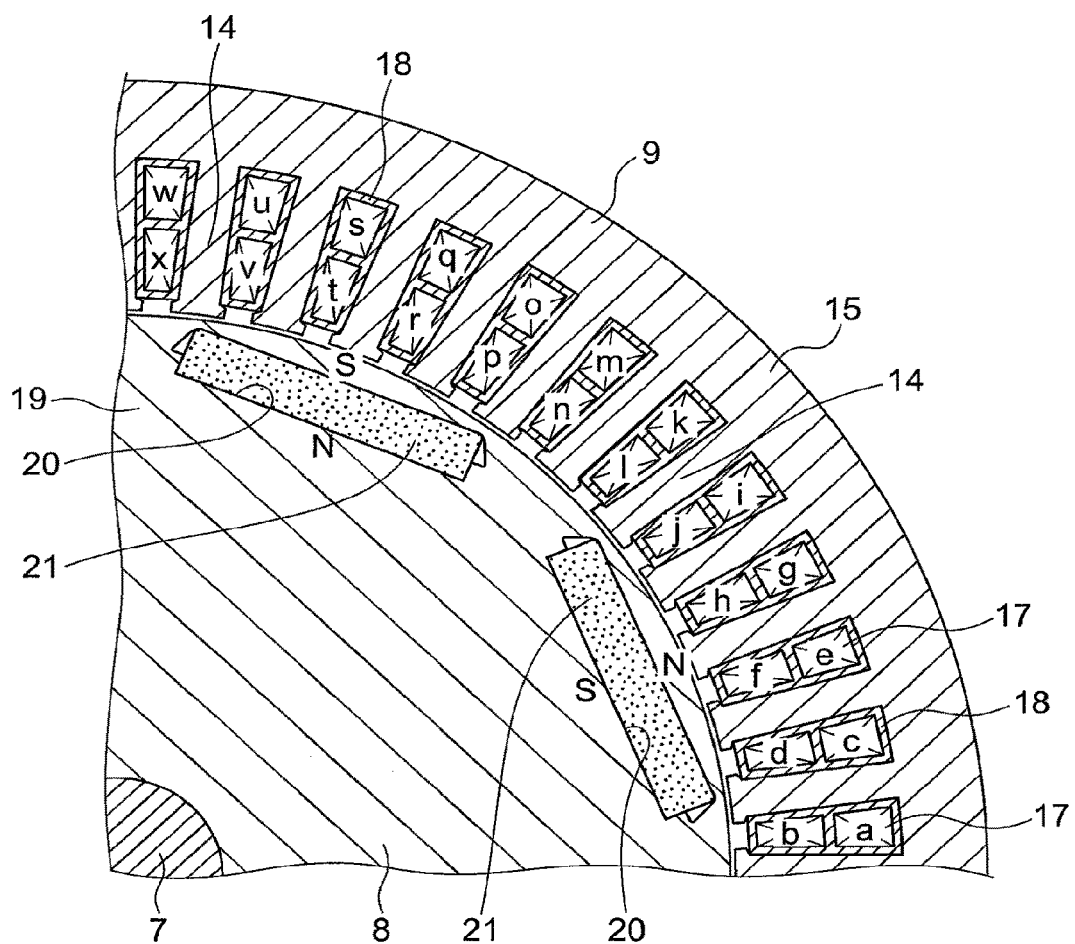
FIG. 4 is a partly enlarged view of FIG. 2.

FIG. 4 is a partly enlarged view of FIG. 2.

In FIG. 4, letters a to x are allocated to the phase conductors 17 in the circumferential direction.

A+, B+, C+, D+, E+, and F+ represent six AC phases having the same amplitude and sequentially shifted by 30°, and A−, B−, C−, D−, E−, and F− represent states in which phases are inverted from A+, B+, C+, D+, E+, and F+, respectively.

When the motor 1 drives a full-pitch distributed winding, the phases of current to be passed through the phase conductors 17 are adjusted as follows.

More specifically, the phases of current to be passed through the phase conductors 17 are adjusted so that the phase A+ is allocated to the phase conductors 17 marked with a and b, the phase B+ to the phase conductors 17 marked with c and d, the phase C+ to the phase conductors 17 marked with e and f, the phase D+ to the phase conductors 17 marked with g and h, the phase E+ to the phase conductors 17 marked with i and j, and the phase F+ to the phase conductors 17 marked with k and l.

Figure 5:
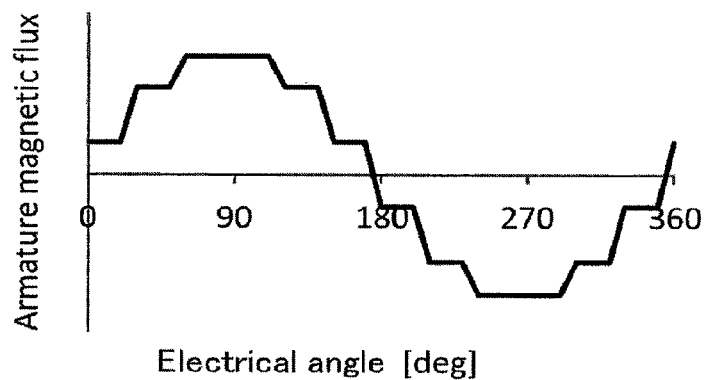
FIG. 5 is a graph showing an armature flux distribution in the motor in FIG. 1 during conduction simulating an armature flux by a 6-phase full-pitch distributed winding.

In this manner, an armature flux for an 8-pole, 48-slot motor having a 6-phase full pitch distributed winding with one slot per pole per phase as shown in FIG. 5 can be provided.

Note that the position shifted by one pole pitch in the rotation direction is in rotation odd symmetry.

More specifically, the phase conductor 17 marked with a for example extends from the front side of the sheet surface in FIG. 4 perpendicularly to the back side, skips over stator slots 16 for one pole pitch in the circumferential direction, and then extends from the back side of the sheet surface to the front side perpendicularly from the stator slot 16 marked with m.

When the motor 1 drives a short-pitch distributed winding, the phases of current to be passed through the phase conductors 17 are adjusted as follows.

More specifically, the phases of current to be passed through the phase conductors 17 are adjusted so that the phase A+ is allocated to the phase conductor 17 marked with a, the phase D− to the phase conductor 17 marked with b, the phase B+ to the phase conductor 17 marked with c, the phase E− to the phase conductor 17 marked with d, the phase C+ to the phase conductor 17 marked with e, the phase F− to the phase conductor 17 marked with f, the phase D+ to the phase conductor 17 marked with g, the phase A− to the phase conductor 17 marked with h, the phase E+ to the phase conductor 17 marked with i, the phase B− to the phase conductor 17 marked with j, the phase F+ to the phase conductor 17 marked with k, and the phase C− to the phase conductor 17 marked with l.

Figure 6:
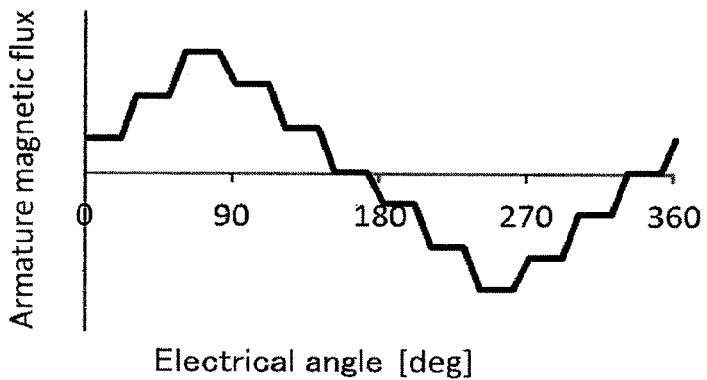
FIG. 6 is a graph showing an armature flux distribution in the motor in FIG. 1 during conduction simulating an armature flux by a 6-phase short-pitch distributed winding.

In this manner, an armature flux for an 8-pole, 48-slot motor having a 6-phase short-pitch distributed winding with one slot per pole per phase as shown in FIG. 6 can be provided.

Note that the position shifted by one pole pitch in the rotation direction is in rotation odd symmetry.

When the motor 1 drives a concentrated winding, the phases of current to be passed through the phase conductors 17 are adjusted as follows.

More specifically, the phases of current to be passed through the phase conductors 17 are adjusted so that the phase A+ is allocated to the phase conductor 17 marked with a, the phase F+ to the phase conductor 17 marked with b, the phase B+ to the phase conductor 17 marked with c, the phase A− to the phase conductor 17 marked with d, the phase C+ to the phase conductor 17 marked with e, the phase B− to the phase conductor 17 marked with f, the phase D+ to the phase conductor 17 marked with g, the phase C− to the phase conductor 17 marked with h, the phase E+ to the phase conductor 17 marked with i, the phase D− to the phase conductor 17 marked with j, the phase F+ to the phase conductor 17 marked with k, and the phase E− to the phase conductor 17 marked with l.

Figure 7:
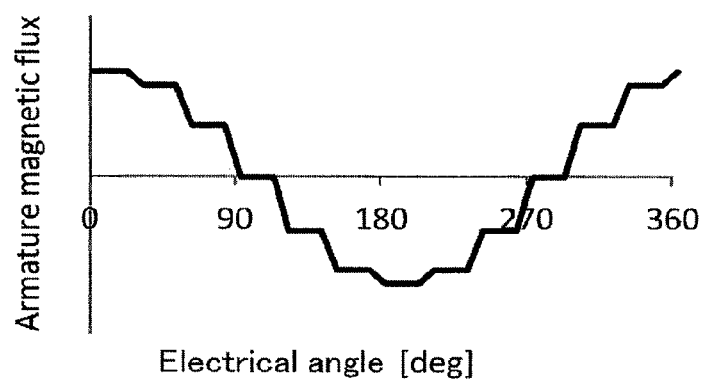
FIG. 7 is a graph showing an armature flux distribution in the motor in FIG. 1 during conduction simulating an armature flux by a 6-phase concentrated winding.

In this manner, an armature flux for an 8-pole, 48-slot motor having a 6-phase concentrated winding with one slot per pole per phase as shown in FIG. 7 can be provided.

Note that the position shifted by one pole pitch in the rotation direction is in rotation odd symmetry.

The phase conductors 17 are conducted in this manner, so that the motor 1 can drive the 6-phase full-pitch winding, the 6-phase short-pitch winding, and the 6-phase concentrated winding.

Unlike conventional motors, the 6-phase motor 1 with any of the above configurations does not need such current feeding that magnetic fluxes generated by the phase coils cancel each other as the magnetic fluxes are combined, and since current may be fed to only the necessary phase conductors 17, magnetic flux waveforms for the 6-phase full-pitch winding, the 6-phase short-pitch winding, and the 6-phase concentrated winding can be provided without creating a useless conductor.

The phase conductors 17 wound around the stator core 15 in the wave winding arrangement shifted per pole pitch in the circumferential direction are connected to the H-bridge circuit constituted by the switches 26, 28, 29, and 30, and therefore the gap magnetic flux waveform can be arbitrarily adjusted without increasing the switches 26, 28, 29, and 30 and the controllers.

Now, the operation of the motor 1 with the above configuration will be described with reference to a 3-phase motor 1.

Similarly to the above, in the 3-phase motor, U+, V+, and W+ represent three AC phases having the same amplitude and sequentially shifted by 120°, and U−, V−, and W− represent states in which the phases are inverted from U+, V+, and W+, respectively.

When the motor 1 drives a full-pitch winding, the phases of current to be passed through the phase conductors 17 are adjusted as follows.

More specifically, when the phases of current are adjusted so that the phase U+ is allocated to the phase conductors 17 marked with a, b, c, and d, the phase W− is allocated to the phase conductors 17 marked with e, f, g, and h, and the phase V+ is allocated to the phase conductors 17 marked with i, j, k, and l, current is passed through the armature according to a conduction method for a 3-phase full-pitch distributed winding.

Figure 8:
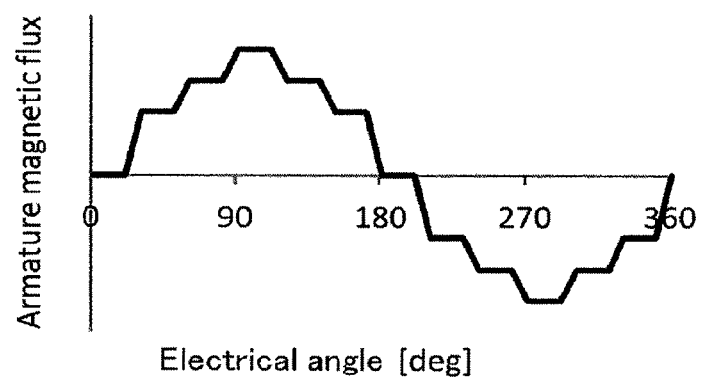
FIG. 8 is a graph showing an armature flux distribution in the motor in FIG. 1 during conduction simulating an armature flux by a 3-phase short-pitch distributed winding.

In this manner, an armature flux for an 8-pole, 48-slot motor having a 3-phase full-pitch winding with two slots per pole per phase as shown in FIG. 8 can be provided.

When the motor 1 drives a concentrated winding, the phases of current to be passed through the phase conductors 17 are adjusted as follows.

Figure 9:
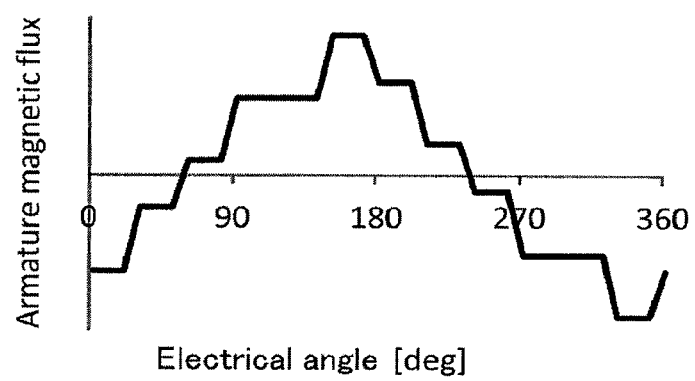
FIG. 9 is a graph showing an armature flux distribution in the motor in FIG. 1 during conduction simulating an armature flux by a 3-phase concentrated winding.

More specifically, an armature flux for an 8-pole, 48-slot motor having a 3-phase concentrated winding as shown in FIG. 9 can be provided when current is passed so that the phase V− is allocated to the phase conductor 17 marked with a, the phase U+ to the phase conductor 17 marked with b, the phase U+ to the phase conductor 17 marked with e, the phase W− to the phase conductor 17 marked with f, the phase W− to the phase conductor 17 marked with i, and the V+ to the phase conductor 17 marked with j, and no current is passed through the phase conductors 17 marked with c, d, g, h, k, and l.

Current is passed through the phase conductors 17 in this manner, so that the motor 1 can drive the 3-phase full-pitch winding and the 3-phase concentrated winding.

In the 3-phase motor 1 with the above configuration, the operation of the first positive electrode side switch 26, the second negative electrode side switch 28, the first negative electrode side switch 29, and the second positive electrode side switch 30 is controlled by the controllers, so that the amplitude and phase of current passing through the phase conductors 17 are controlled for each of the phase conductors 17, a gap magnetic flux density waveform between the stator 9 and the rotor 8 can be adjusted in an arbitrary manner, an optimum magnetic flux waveform required for each operation point can be formed, a full-pitch winding, a short-pitch winding, and a concentrated winding can be driven, and the torque pulsation may be reduced depending on the operation state or the use efficiency of the magnetic flux may be improved or changed.

The armature winding is configured so that the amplitude and phase can be changed independently by the four switches 26, 28, 29, and 30 and the phase conductors 17, the phase conductors 17 inserted through the stator slots 16 are configured so that the current amplitudes and phases can be independently controlled, and therefore a conductor loss attributable to a useless phase conductor is not generated.

Therefore, the motor 1 with the above configuration drives in a conduction pattern that simulates a gap magnetic flux waveform by a short-pitch distributed winding in order to reduce torque ripple when driving at low rotation speed with low torque.

The motor drives in a conduction pattern that simulates a gap magnetic flux waveform by a full-pitch distributed winding with a high magnetic flux use ratio when driving with high torque.

During driving at high rotation speed with high torque that cause the permanent magnet 21 to be demagnetized, a phase conductor 17 facing the delay side (back side) in the rotation direction of the permanent magnet 21 with a gap therebetween according to the rotation of the rotor 8 is driven with smaller conduction current than usual.

Meanwhile, a phase conductor 17 facing the center part is driven with more conduction current than usual.

In this manner, a magnetic flux generated by a coil that applies a reverse magnetic field on the part of the permanent magnet 21 most prone to demagnetization can be reduced while maintaining the output torque, so that anti-demagnetization performance can be improved.

Note that controllers for controlling the switches 26, 30, 29, and 28 by adjusting current to be passed through the phase conductors 17 are provided for the switches on a one-to-one basis, but since the first positive electrode side switch 26 and the first negative electrode side switch 29 are always turned on and off in synchronization with each other and the second negative electrode side switch 28 and the second positive electrode side switch 30 are always turned on and off in synchronization with each other, the first positive electrode side switch 26 and the first negative electrode side switch 29 may be controlled using the same controller while the second negative electrode side switch 28 and the second positive electrode side switch 30 may be controlled using the same controller.

In this manner, the number of controllers may be reduced to half.

In addition, according to the embodiment, the two phase conductors 17 inserted in the stator slot 16 are provided side by side in the radial direction but the phase conductors may be arranged in the circumferential direction.

In this way, inductance variations among the phases may be reduced.

Second Embodiment

Figure 10:
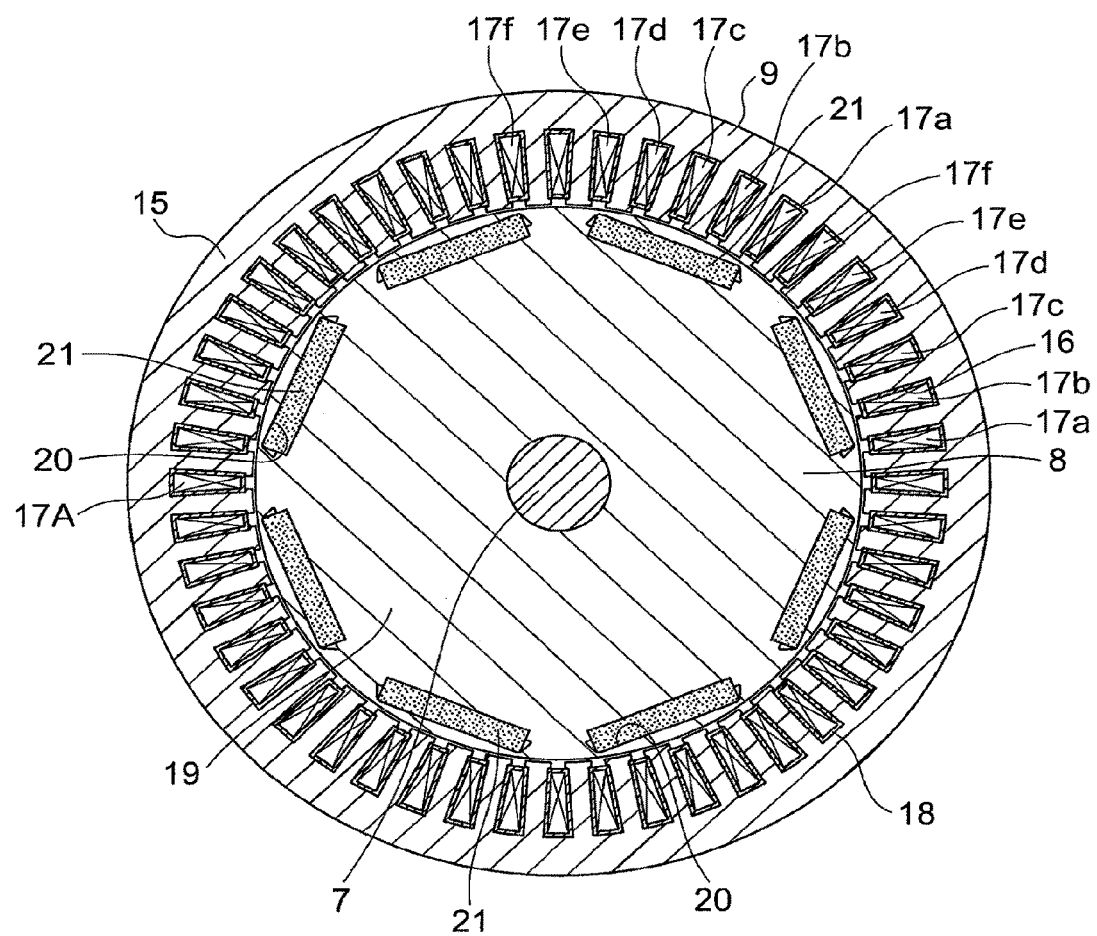
FIG. 10 is a front sectional view of a motor according to a second embodiment of the present invention.

FIG. 10 is a front sectional view of a motor 1 according to a second embodiment of the present invention.

According to the embodiment, one phase conductor 17 is inserted in each of the stator slots 16.

More specifically, in the 6-phase motor 1, the phase conductors 17 denoted as 17*a*, 17*b*, 17*c*, 17*d*, 17*e*, and 17*f* each extend perpendicularly from the front side of the sheet surface to the back side in FIG. 10, then skip over stator slots 16 for one pole pitch in the circumferential direction, and then extend from the stator slot 16 perpendicularly from the back surface of the sheet surface to the front side.

The phase conductors 17*a*, 17*b*, 17*c*, 17*d*, 17*e*, and 17*f* are each individually connected to an H-bridge circuit constituted by the first positive electrode side switch 26, the second negative electrode side switch 28, the first negative electrode side switch 29, and the second positive electrode side switch 30.

The rest of the configuration is the same as that of the motor 1 according to the first embodiment.

In the motor 1 according to the second embodiment, composite current of current through two phase conductors 17 inserted in the stator slot 16 according to the first embodiment is passed through the phase conductors 17*a*, 17*b*, 17*c*, 17*d*, 17*e*, and 17*f*.

In this manner, the number of DC power supplies 27, the number of switches 26, 30, 29, and 28, and the number of controllers can be reduced to half, so that the machine can be compact.

Only one molded insulator 18 is provided for each of the phase conductors 17*a*, 17*b*, 17*c*, 17*d*, 17*e*, and 17*f* in the stator slots 16, so that the occupancy of the phase conductors 17*a*, 17*b*, 17*c*, 17*d*, 17*e*, and 17*f* in the stator slots 16 can be increased and high efficiency can be achieved.

Third Embodiment

Figure 11:
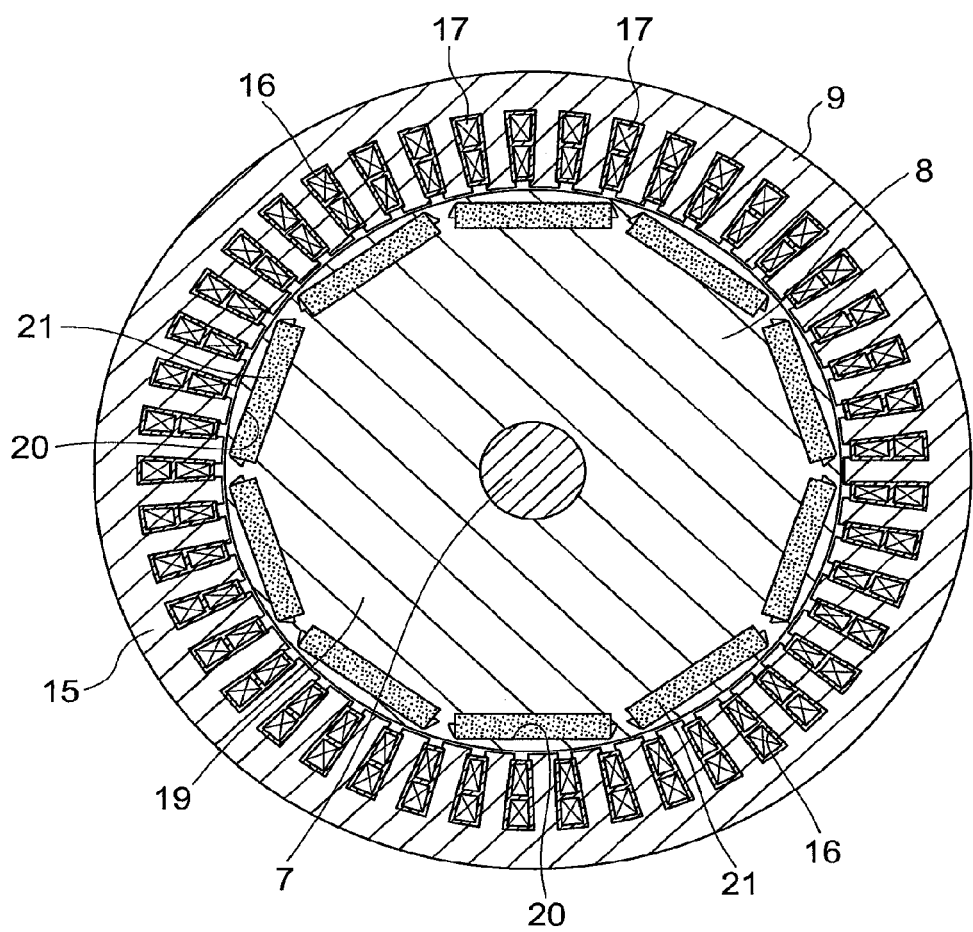
FIG. 11 is a front sectional view of a motor according to a third embodiment of the present invention.
Figure 12:
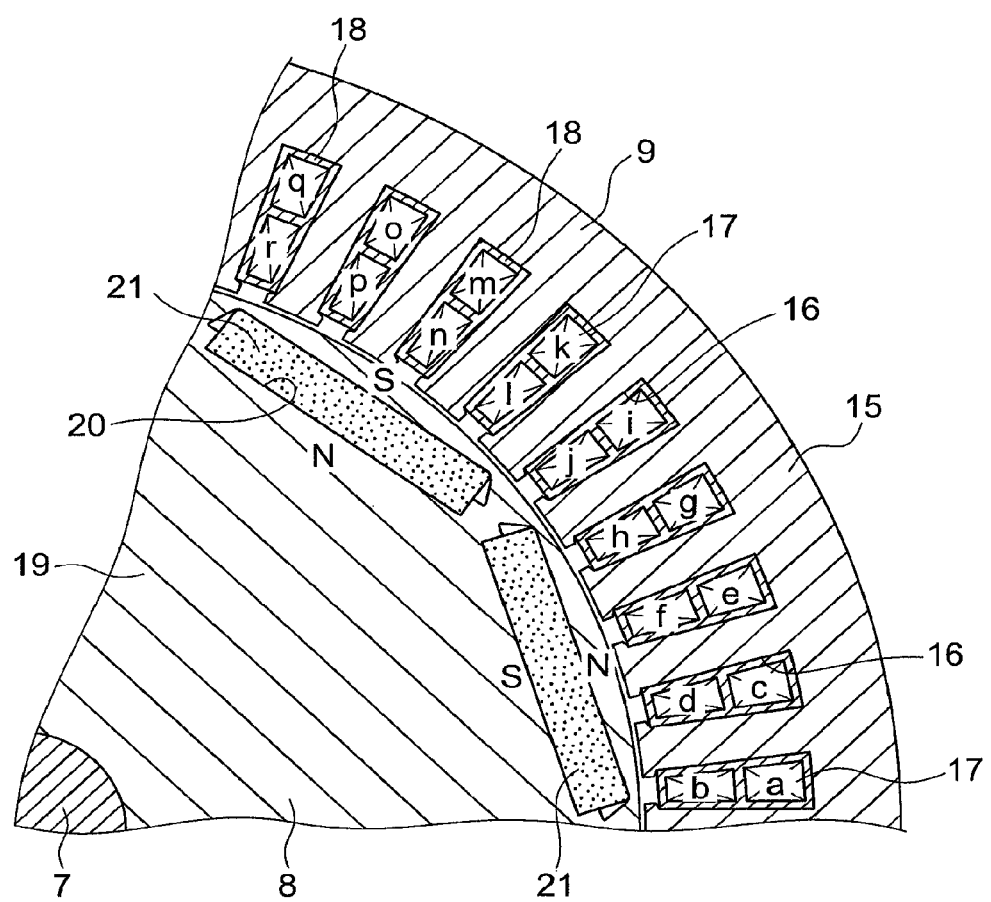
FIG. 12 is a partly enlarged view of FIG. 11.

FIG. 11 is a front sectional view of a motor 1 according to a third embodiment of the present invention, and FIG. 12 is a partly enlarged view of FIG. 11.

The motor 1 according to the embodiment is a 10-pole, 45-slot permanent magnet motor.

The phase conductors 17 of the motor 1 are each inserted through a stator slot 16 from one end of the stator core 15 in the axial direction and exposed on the other end thereof, subsequently skip over stator slots 16 in the circumferential direction, are then inserted through the ninth stator slot 16 from the other end of the stator slot 16 in the axial direction of the stator core 15 and exposed on the one end thereof, subsequently skip over stator slots 16 in the circumferential direction, and are again inserted through the ninth stator slot 16 from the one end of the stator slot 16 in the axial direction of the stator core 15 and exposed on the other end thereof.

The phase conductors 17 are inserted through the stator slots 16 in this manner three times in total around the stator core 15 in a wave winding arrangement.

Note that one phase conductor 17 shown in FIGS. 11 and 12 includes two phase conductors 17 having the same phase inserted in each stator slot 16, and 18 phase conductors 17 in total are wound around the stator core 15 in the wave winding arrangement.

Note that the sectional views in FIGS. 11 and 12 show only one position collectively while a section of three positions of the phase conductors 17 including the inner diameter side phase conductor 17 and the outer diameter side phase conductor 17 should be indicated to represent the actual arrangement.

The phase conductors 17 are each individually electrically connected to an H-bridge circuit constituted by the first positive electrode side switch 26, the second negative electrode side switch 28, the first negative electrode side switch 29, and the second positive electrode side switch 30.

The rest of the configuration is the same as that of the motor 1 according to the first embodiment.

Now, the operation of the motor 1 with the above configuration will be described with reference to a 9-phase motor 1.

In FIG. 12, letters a to r are allocated to the phase conductors 17 in the circumferential direction.

A+, B+, C+, D+, E+, F+, G+, H+, and I+ represent nine AC phases having the same amplitude and sequentially shifted by 40°, and A−, B−, C−, D−, E−, F−, G−, H−, and I− represent states in which the phases are inverted with respect to A+, B+, C+, D+, E+, F+, G+, H+, and I+, respectively.

In the case, the phases of current to be passed through the phase conductors 17 are adjusted so that the phase A+ is allocated to the phase conductor 17 marked with a, the phase F− to the phase conductor 17 marked with b, the phase B+ to the phase conductor 17 marked with c, the phase G- to the phase conductor 17 marked with d, the phase C+ to the phase conductor 17 marked with e, the phase H− to the phase conductor 17 marked with f, the phase D+ to the phase conductor 17 marked with g, the phase I− to the phase conductor 17 marked with h, the phase E+ to the phase conductor 17 marked with i, the phase A− to the phase conductor 17 marked with j, the phase F+ to the phase conductor 17 marked with k, the phase B− to the phase conductor 17 marked with l, the phase G+ to the phase conductor 17 marked with m, the phase C− to the phase conductor 17 marked with n, the phase H+ to the phase conductor 17 marked with o, the phase D− to the phase conductor 17 marked with p, the phase I+ to the phase conductor 17 marked with q, and the phase E− to the phase conductor 17 marked with r.

Figure 13:
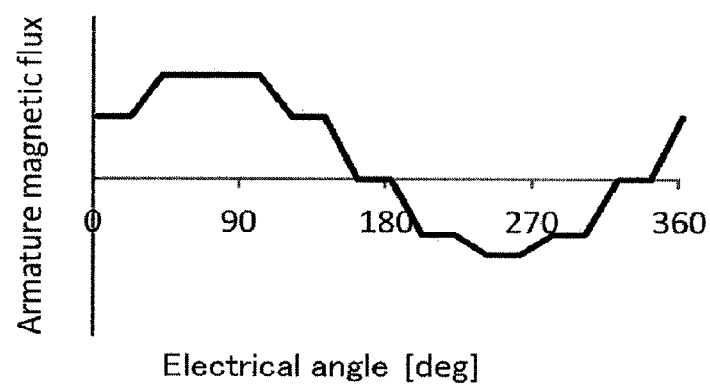
FIG. 13 is a graph showing an armature flux distribution in the motor shown in FIG. 11 during conduction simulating an armature flux by a 9-phase short-pitch distributed winding.

In this manner, an armature flux for a 10-pole, 45-slot motor having a 9-phase short-pitch distributed winding with ½ slot per pole per phase as shown in FIG. 13 can be provided.

Note that the part of which rotation direction is not shown is in rotation even symmetry.

For example, in FIG. 12, the phase conductor 17 marked with a extends perpendicularly from the front side of the sheet surface to the back side, then spans stator slots 16 for two pole pitches in the circumferential direction, and then extends perpendicularly from the back side of the sheet surface to the front side from the adjacent stator slot 16 on the left of q that is not shown.

The phases of current to be passed through the phase conductors 17 are adjusted so that the phase I− is allocated to the phase conductor 17 marked with a, the phase A+ to the phase conductor 17 marked with b, the phase A− to the phase conductor 17 marked with c, the phase B+ to the phase conductor 17 marked with d, the phase B− to the phase conductor 17 marked with e, the phase C+ to the phase conductor 17 marked with f, the phase C− to the phase conductor 17 marked with g, the phase D+ to the phase conductor 17 marked with h, the phase D− to the phase conductor 17 marked with i, the phase E+ to the phase conductor 17 marked with j, the phase E− to the phase conductor 17 marked with k, the phase F+ to the phase conductor 17 marked with l, the phase F− to the phase conductor 17 marked with m, the phase G+ to the phase conductor 17 marked with n, the phase G− to the phase conductor 17 marked with o, the phase H+ to the phase conductor 17 marked with p, the phase H− to the phase conductor 17 marked with q, and the phase I+ to the phase conductor 17 marked with r.

Figure 14:
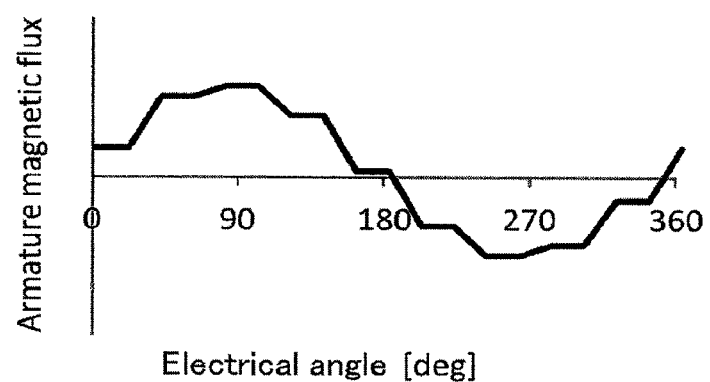
FIG. 14 is a graph showing an armature flux distribution in the motor shown in FIG. 11 during conduction simulating an armature flux by a 9-phase concentrated winding.

In this manner, an armature flux for a 10-pole, 45-slot motor with a 9-phase concentrated winding as shown in FIG. 14 can be provided.

Also in this case, the part of which rotation direction is not shown is in rotation even symmetry.

Now, the operation of the motor 1 with the above configuration will be described with reference to a 3-phase motor 1.

Similarly, in the 3-phase motor 1, phases U+, V+, and W+ are three AC phases having the same amplitude and sequentially shifted by 120°, and phases U−, V−, and W− represent states in which the phases are reversed with respect to the phases U+, V+, and W+, respectively.

In this case, the phases of current to be passed through the phase conductors 17 are adjusted so that the phase U+ is allocated to the phase conductors 17 marked with a, b, and c, the phase W− to the phase conductors 17 marked with d, e, and f, the phase V+ to the phase conductors 17 marked with g, h, and i, the phase U− to the phase conductors 17 marked with j, k, and l, the phase W+ to the phase conductors 17 marked with m, n, and o, and the phase V− to the phase conductors 17 marked with p, q, and r.

Figure 15:
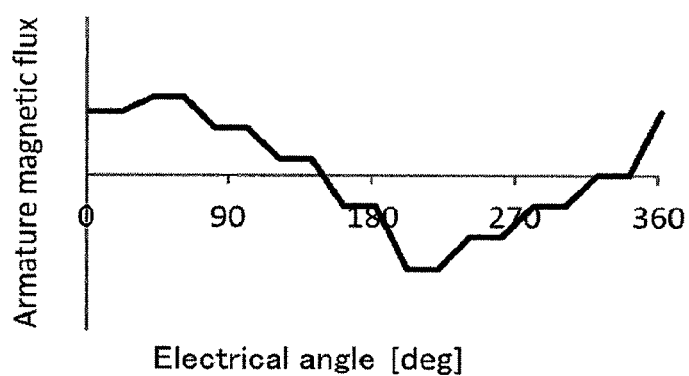
FIG. 15 is a graph showing an armature flux distribution in the motor shown in FIG. 11 during conduction simulating an armature flux by a 3-phase short-pitch distributed winding.

In this manner, a magnetic flux for a 10-pole, 45 slot motor having a 3-phase short-pitch distributed winding as shown in FIG. 15 can be provided.

Similarly, the phases of current to be passed through the phase conductors 17 are adjusted so that the phase V+ is allocated to the phase conductor 17 marked with a, the phase U+ to the phase conductor 17 marked with b, the phase U− to the phase conductor 17 marked with c, the phase U+ to the phase conductor 17 marked with d, the phase U− to the phase conductor 17 with e, the phase W− to the phase conductor 17 with f, the phase W+ to the phase conductor 17 marked with g, the phase V+ to the phase conductor 17 with h, the phase V− to the phase conductor 17 marked with i, the phase V+ to the phase conductor 17 marked with j, the phase V− to the phase conductor 17 marked with k, the phase U− to the phase conductor 17 marked with l, the phase U+ to the phase conductor 17 marked with m, the phase W+ to the phase conductor 17 marked with n, the phase W− to the phase conductor 17 marked with o, the phase W+ to the phase conductor 17 marked with p, the phase W− to the phase conductor 17 marked with q, and the phase V− to the phase conductor 17 marked with r.

Figure 16:
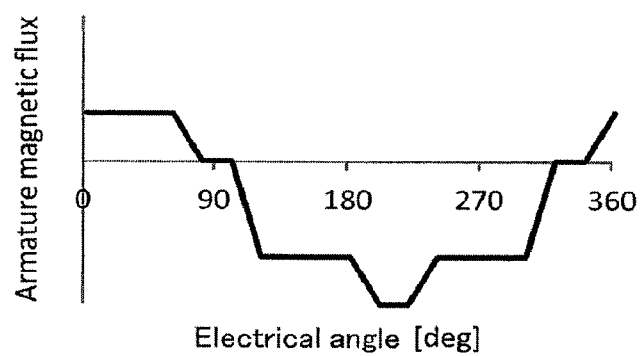
FIG. 16 is a graph showing an armature flux distribution in the motor shown in FIG. 11 during conduction simulating an armature flux by a 3-phase concentrated winding.
Figure 17:
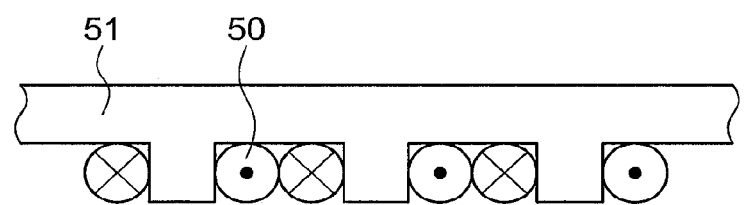
FIG. 17 is a view of coils wound around a stator core in a conventional rotating electric machine as viewed in the axial direction of the rotating electric machine.
Figure 18:
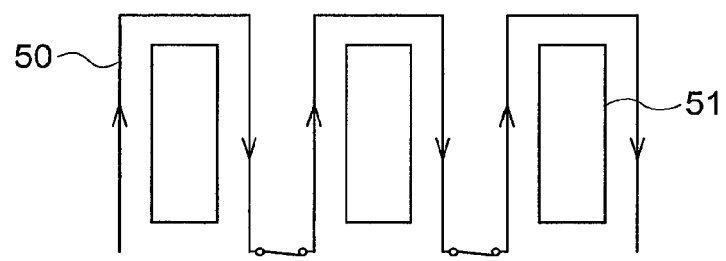
FIG. 18 is a diagram showing the flow of current through coils when viewed in the radial direction of the rotating electric machine in FIG. 17.

In this manner, an armature flux for a 10-pole, 45-slot motor having a 3-phase concentrated winding as shown in FIG. 16 can be provided.

Also in this case, current may be passed so that the phase W− is a allocated to the phase conductor 17 marked with a, the phase U+ to the phase conductor 17 marked with b, the phase U− to the phase conductor 17 marked with g, the phase V+ to the phase conductor 17 marked with h, the phase V− to the phase conductor 17 marked with m, and the phase W+ to the phase conductor 17 marked with n while one third of the phase conductors 17 are inactivated, and an armature flux for a 10-pole, 15-slot motor having a 3-phase concentrated winding can be provided while assuming that the inactive stator slots as dummy slots.

This configuration still provides the same advantageous effects as those of the first embodiment.

In the motor 1 according to the third embodiment, two phase conductors 17 are inserted through each of the stator slots 16, while one phase conductor for each of the stator slot 16, i.e., nine phase conductors in total may be inserted, current having an amplitude and a phase resulting from the vector sum of current passed through the two phase conductors may be passed through the phase conductors, and still the same advantageous effects may be provided.

Note that in the description of the embodiments, the second negative electrode side switch 28 is used as a negative electrode side control part and the second positive electrode side switch 30 is used as a positive electrode side control part, but naturally the arrangement is not limited to the above.

For example, diodes may be used in place of the second negative electrode side switch 28 serving as the negative electrode side control part and the second positive electrode side switch 30 serving as the positive electrode side control part both for controlling current, and these diodes may constitute an H-bridge circuit together with the first positive electrode side switch 26 and the first negative electrode side switch 29.

In the above description, the motor 1 is a permanent magnet motor having the permanent magnets 21 at the rotor 8, but the rotor 8 may be a switched reluctance motor constituted by a rotor core having projecting poles, a wound field motor provided with a winding around the projecting poles of a rotor core to form magnetic poles, an induction motor having phase conductors inserted in a plurality of grooves at a rotor core and short-circuited by a ring-shaped conductor between the axial ends thereof, or a synchronous reluctance motor provided with a plurality of gaps on the inner side of a substantially circular rotor core, and still the same advantageous effects may be provided.

Alternatively, a linear motor having a configuration in which a rotor is unrolled on a flat surface may be used for the motor 1 according to any of the embodiments, and still the same advantageous effects can be provided.

The invention is also applicable to a generator as a rotating electric machine.

REFERENCE SIGNS LIST

1 Motor
2 Frame
3 Load side bracket
4 Counter load side bracket
5 Load side bearing
6 Counter load side bearing
7 Shaft
8 Rotor
9 Stator
10 Case
11 Bearing presser
12 Wave washer
13 Yoke
14 Teeth
15 Stator core
16 Stator slot
17, 17a, 17b, 17c, 17d, 17e, 17f Phase conductor
18 Insulator
19 Rotor core
20 Magnetic slot
21 Permanent magnet
22 End plate
23 Load side lead
24 Counter load side lead
25 Outlet
26 First positive electrode side switch
27 DC power supply
28 Second negative electrode side switch (negative electrode side control part)
29 First negative electrode side switch
30 Second positive electrode side switch (positive electrode side control part)
31 Positive electrode terminal
32 Negative electrode terminal
50 Coil
51 Stator core

The invention claimed is:

1. A rotating electric machine, comprising:
a rotor; and
a stator provided to surround the rotor, and including a stator core in which a plurality of axially extending stator slots are formed, and phase conductors inserted through the stator slots each in a wave winding arrangement,
the phase conductors each having one end electrically connected to a positive electrode terminal of one of DC power supplies through a first positive electrode side switch that turns on and off current and electrically connected to a negative electrode terminal of one of the DC power supplies through a negative electrode side control part that controls current,
the phase conductors each having the other end electrically connected to the negative electrode terminal of one of the DC power supplies through a first negative electrode side switch that turns on and off current and electrically connected to the positive electrode terminal of one of the DC power supplies through a positive electrode side control part that controls current,
the first positive electrode side switch, the negative electrode side control part, the first negative electrode side switch, and the positive electrode side control part being controlled by a controller, so that an amplitude and a phase of current passing through each of the phase conductors are individually controlled for each of the phase conductors,
a total number of the DC power supplies being equal to a total number of the phase conductors inserted through the stator slots, and each of the phase conductors being electrically connected to a respective one of the DC power supplies on a one-to-one basis.

2. The rotating electric machine of claim 1, wherein the negative electrode side control part is a second negative electrode side switch that turns on and off current, and the positive electrode side control part is a second positive electrode side switch that turns on and off current.

3. The rotating electric machine of claim 1, wherein the controller is individually provided for each of the first positive electrode side switch, the negative electrode side control part, the first negative electrode side switch, and the positive electrode side part.

4. The rotating electric machine of claim 1, wherein the controller is provided singly for the first positive electrode side switch and the first negative electrode side switch, and the controller is provided singly for the negative electrode side control part and the positive electrode side control part.

5. The rotating electric machine of claim 1, wherein a plurality of the phase conductors are inserted through each of the stator slots in a radial or circumferential direction.

6. The rotating electric machine of claim 1, wherein one of the phase conductors is inserted through each of the stator slots.

7. The rotating electric machine of claim 1, wherein the rotor has a rotor core in which a permanent magnet is stored in an axially extending magnet slot, and the amplitude of current passing through the phase conductor facing an end of the permanent magnet on a delay side in a rotation direction of the rotating rotor is smaller than the amplitude of current passing through the phase conductor before the phase conductor faces the end.

8. The rotating electric machine of claim 1, wherein the first positive electrode side switch, the negative electrode side control part, the first negative electrode side switch, and the positive electrode side control part constitute an H-bridge circuit.

9. The rotating electric machine of claim 1, wherein the rotating electric machine is a motor.

10. The rotating electric machine of claim 1, wherein each respective one of the phase conductors is electrically connected to a respective H-bridge circuit of a plurality of H-bridge circuits, and wherein each respective one of the H-bridge circuits is provided with a respective one of the DC power supplies on a one-to-one basis.

11. A rotating electric machine, comprising:
a rotor; and
a stator provided to surround the rotor, and including a stator core in which a plurality of axially extending stator slots are formed, and phase conductors inserted through the stator slots each in a wave winding arrangement,
the phase conductors each having one end electrically connected to a positive electrode terminal of one of DC power supplies through a first positive electrode side switch that turns on and off current and electrically connected to a negative electrode terminal of one of the DC power supplies through a negative electrode side control part that controls current,
the phase conductors each having the other end electrically connected to the negative electrode terminal of one of the DC power supplies through a first negative electrode side switch that turns on and off current and electrically connected to the positive electrode terminal of one of the DC power supplies through a positive electrode side control part that controls current,
the first positive electrode side switch, the negative electrode side control part, the first negative electrode side switch, and the positive electrode side control part being controlled by a controller, so that an amplitude and a phase of current passing through each of the phase conductors are individually controlled for each of the phase conductors,
the number of the phases is equal to a value obtained by dividing the number of the stator slots by a greatest common divisor of the number of poles of the rotor and the number of the stator slots.

\* \* \* \* \*